United States Patent
Wang et al.

(10) Patent No.: US 11,095,866 B2
(45) Date of Patent: Aug. 17, 2021

(54) 3D IMAGE SENSING SYSTEM AND ASSOCIATED ELECTRONIC DEVICE AND TIME-OF-FLIGHT DISTANCE MEASUREMENT METHOD

(71) Applicant: SHENZHEN GOODIX TECHNOLOGY CO., LTD., Shenzhen (CN)

(72) Inventors: Hao-Jen Wang, Shenzhen (CN); Chung-Te Li, Shenzhen (CN)

(73) Assignee: SHENZHEN GOODIX TECHNOLOGY CO., LTD., Guangdong (TW)

( * ) Notice: Subject to any disclaimer, the term of this patent is extended or adjusted under 35 U.S.C. 154(b) by 0 days.

(21) Appl. No.: 16/951,628

(22) Filed: Nov. 18, 2020

(65) Prior Publication Data

US 2021/0176445 A1  Jun. 10, 2021

Related U.S. Application Data

(63) Continuation-in-part of application No. PCT/CN2019/123735, filed on Dec. 6, 2019.

(51) Int. Cl.
*G01S 7/497* (2006.01)
*H04N 13/128* (2018.01)
*G01S 17/894* (2020.01)

(52) U.S. Cl.
CPC ......... *H04N 13/128* (2018.05); *G01S 17/894* (2020.01)

(58) Field of Classification Search
CPC .............................. H04N 13/128; G01S 17/894
(Continued)

(56) References Cited

U.S. PATENT DOCUMENTS

| 8,274,037 B2 | 9/2012 | Ritter et al. |
| 8,796,637 B1 | 8/2014 | Burr et al. |

(Continued)

FOREIGN PATENT DOCUMENTS

| CN | 107657635 A | 2/2018 |
| CN | 108711167 A | 10/2018 |

(Continued)

OTHER PUBLICATIONS

Sarbolandi, Hamed & Plack, Markus & Kolb, Andreas. (2018). Pulse Based Time-of-Flight Range Sensing. Sensors. 18. 1679. 10.3390/s18061679.

(Continued)

*Primary Examiner* — Nguyen T Truong
(74) *Attorney, Agent, or Firm* — WPAT, P.C., Intellectual Property Attorneys; Anthony King

(57) ABSTRACT

A 3D image sensing system includes: a 3D image sensor (100), including: a light-emitting module (102), configured to emit a structured light to a target (300), the structured light has a known pattern; and a light-sensing module (104) receives a reflected structured light of the structured light that is reflected by the target; and a processor (110), configured to perform a time-of-flight distance measurement to obtain a first distance corresponding to the target based on time-of-flights of the structured light and the reflected structured light, the first distance has a global offset, the processor (110) establishes an unknown distance image based on the reflected structured light, estimates a disparity between the unknown distance image and a known distance image according to the known pattern, calculates a global compensation coefficient based on the disparity, and compensates the first distance to eliminate the global offset according to the global compensation coefficient.

16 Claims, 6 Drawing Sheets

(58) Field of Classification Search
USPC .......................................................... 348/46
See application file for complete search history.

(56) References Cited

U.S. PATENT DOCUMENTS

2019/0304115 A1    10/2019  Sladkov et al.
2019/0339369 A1*   11/2019  Fenton .................. G01S 17/894

FOREIGN PATENT DOCUMENTS

| CN | 108917639 A | 11/2018 |
|----|-------------|---------|
| CN | 109242901 A | 1/2019  |

OTHER PUBLICATIONS

Dieter Kaegi, ESPROS Photonics Corporation, Calibrating Time-Of-Flight Cameras.
English abstract of CN107657635A.
English abstract of CN108711167A.
English abstract of CN108917639A.
English abstract of CN109242901A.
International Search Report of PCT/CN2019/123735.
Notice Receipt Search PCT/CN2019/123735.
Notice of Search Report for PCT/CN2019/123735.
Notice of Filing Date for PCT/CN2019/123735.
Specification and drawings of PCT/CN2019/123735.
PCT Request of PCT/CN2019/123735.
Opinion Report of PCT/CN2019/123735.

* cited by examiner

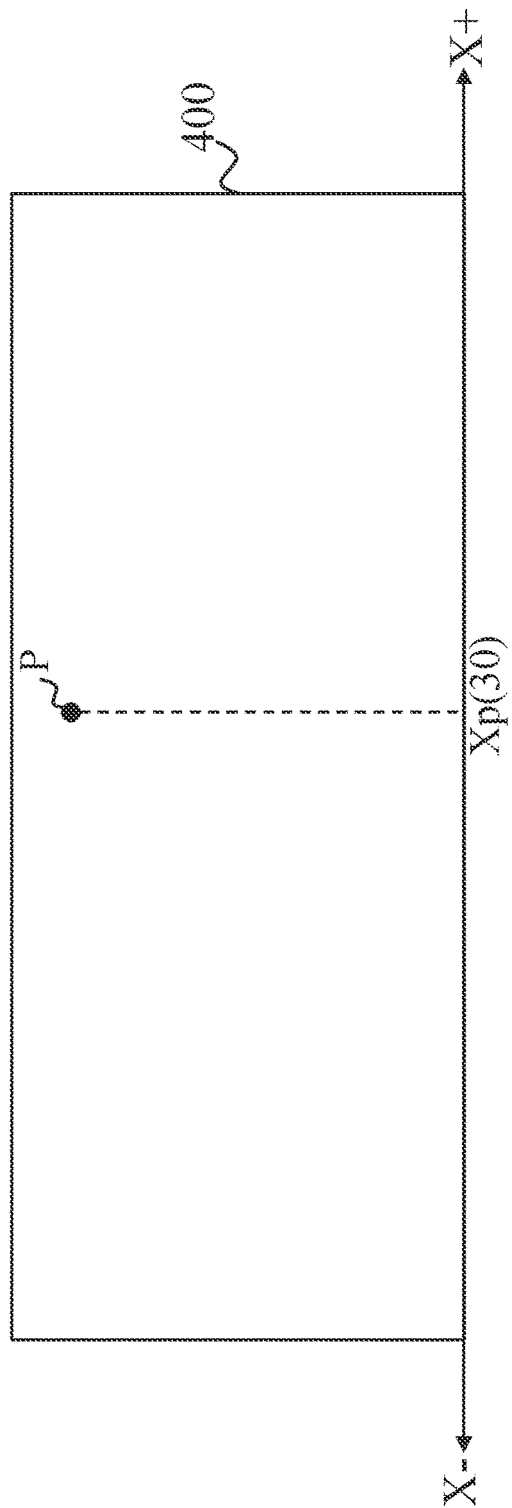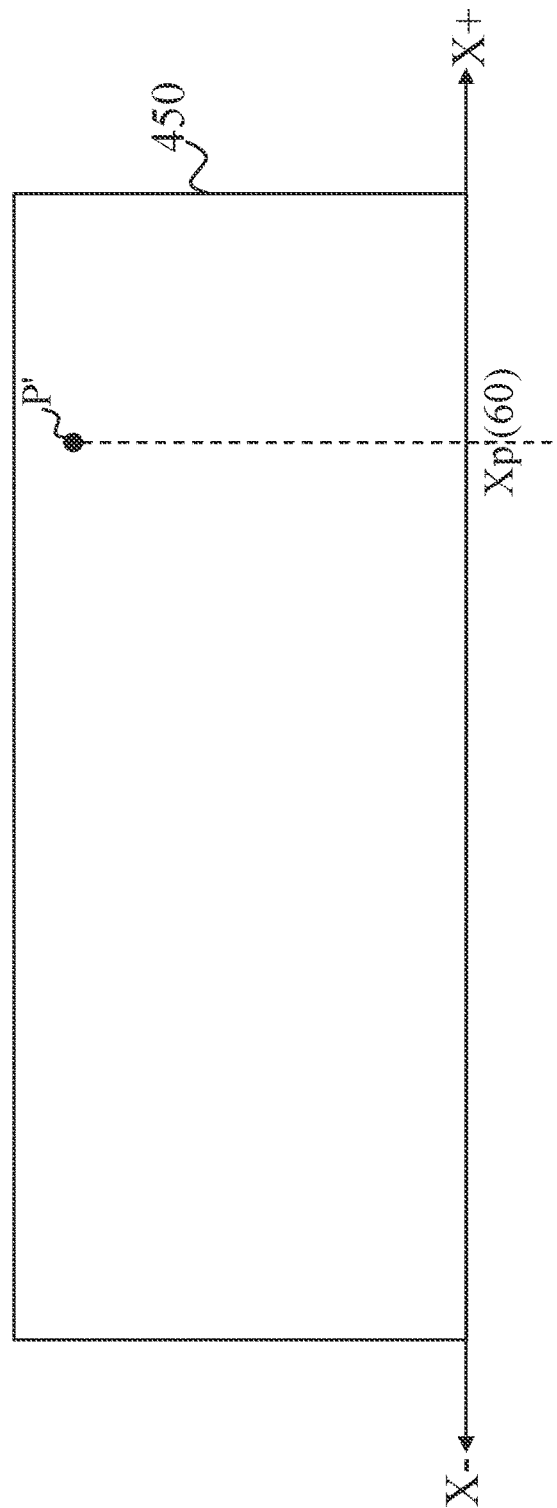

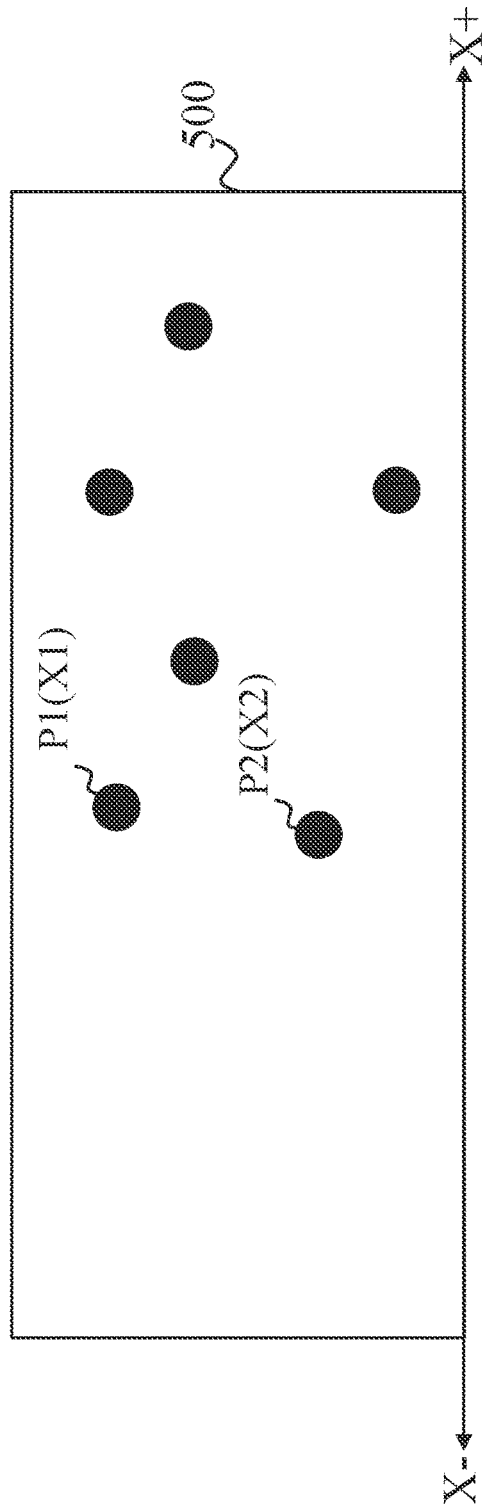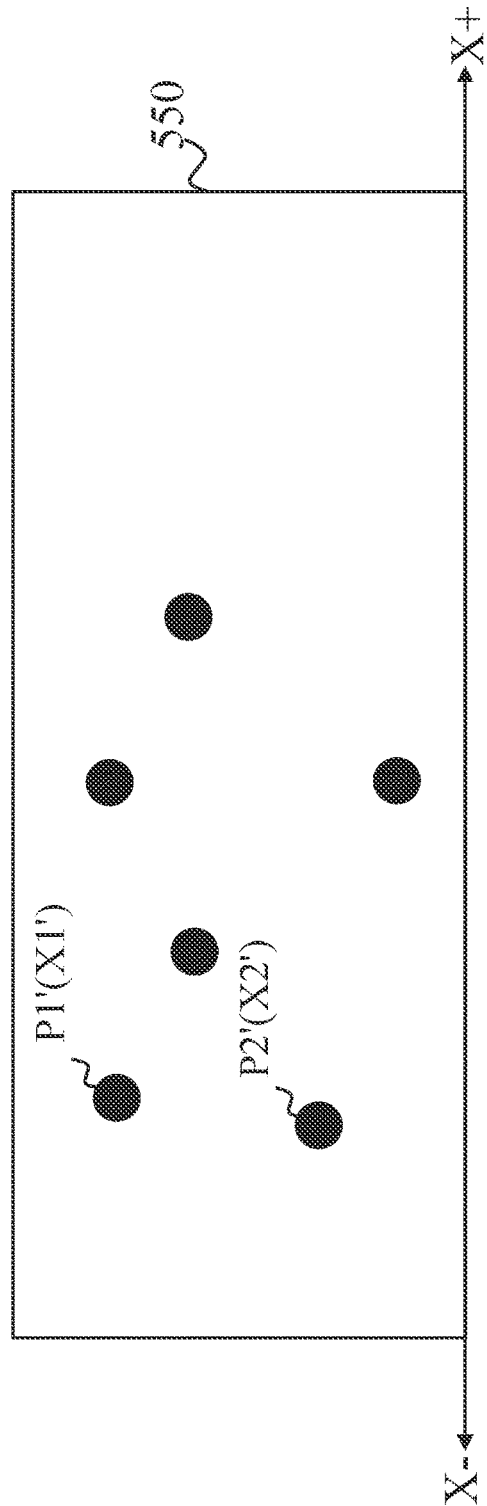

3D IMAGE SENSING SYSTEM AND ASSOCIATED ELECTRONIC DEVICE AND TIME-OF-FLIGHT DISTANCE MEASUREMENT METHOD

CROSS REFERENCE TO RELATED APPLICATIONS

The present application is a continuation-in-part of international application No. PCT/CN2019/123735, filed on Dec. 6, 2019, which is hereby incorporated by reference in its entirety

TECHNICAL FIELD

The present application relates to an image sensing system; in particular, a 3D image sensing system and associated electronic device and time-of-flight (TOF) distance measurement method.

BACKGROUND

CMOS image sensors have been mass produced and widely used. Conventional image sensors can be used to generate two-dimensional (2D) images and videos. Recently, image sensors and systems capable of generating three-dimensional (3D) images (or depth images) attract much attention; these 3D image sensors can be used for the purpose of face recognition, and augmented reality (AR)/virtual reality (VR), which can be applied in various equipment such as mobile phones, drones, security systems, artificial intelligence systems, etc.

Current 3D image sensors can be implemented in three main approaches: stereo binocular, structured light, and time of flight (ToF).

ToF uses specifically designed pixels to measure the time that the photon takes to fly and return so as to measure the distance. To increase the accuracy and decrease the cost of modeling, how to improve the accuracy of the ToF sensor has become an important work project.

SUMMARY OF THE INVENTION

One purpose of the present application is to provide an image sensing system; in particular, a 3D image sensing system and associated electronic device and TOF distance measurement method, to address the above-mentioned issue.

One embodiment of the present application discloses a 3D image sensing system that includes: a 3D image sensor, including: a light-emitting module, configured to emit a structured light to a target, wherein the structured light has a known pattern; and a light-sensing module, configured to receive a reflected structured light of the structured light that is reflected by the target; and a processor, coupled to the 3D image sensor and configured to perform a time-of-flight distance measurement to obtain a first distance corresponding to the target based on time-of-flights of the structured light and the reflected structured light, wherein the first distance has a global offset, wherein the processor also establishes an unknown distance image based on the reflected structured light, estimates a disparity between the unknown distance image and a known distance image according to the known pattern, calculates a global compensation coefficient based on the disparity, and compensates the first distance to eliminate the global offset according to the global compensation coefficient, wherein the known distance image is established with respect to a reference object with a known distance based on the structured light.

One embodiment of the present application discloses a time-of-flight distance measurement method, including the steps of: emitting a structured light to a target, wherein the structured light has a known pattern; receiving a reflected structured light reflected by the target; performing a time-of-flight distance measurement to obtain a first distance corresponding to the target based on the time-of-flights of the structured light and the reflected structured light, wherein the first distance has a global offset; establishing an unknown distance image based on the reflected structured light, estimating a disparity between the unknown distance image and a known distance image according to the known pattern, wherein the known distance image is created based on the structured light with respect to a reference object with a known distance; calculating a global compensation coefficient based on the disparity; and compensating the first distance according to the global compensation coefficient to eliminate the global offset.

One embodiment of the present application discloses and electronic device, including a memory, a processor, and a computer program stored on the memory and operable on the processor, wherein the processor, when running the computer program, is configured to: performing a time-of-flight distance measurement to obtain a first distance corresponding to a target based on time-of-flights of a structured light having a known pattern projected to the target and a reflected structured light from the target, wherein the first distance has a global offset; generating an unknown distance image based on the reflected structured light; estimating a disparity between the unknown distance image and a known distance image according to the known pattern, wherein the known distance image is created based on the structured light with respect to a reference object with a known distance; calculating a global compensation coefficient based on the disparity; and compensating the first distance according to the global compensation coefficient to eliminate the global offset.

The processor of the 3D image sensing system disclosed by the present application can compensate the global offset of the TOF distance, and the difference between the TOF distance after the global offset is compensated and the true depth is reduced. Therefore, the TOF distance after the global offset is compensated can reflect the true depth more accurately, thereby improving the accuracy of image sensing.

BRIEF DESCRIPTION OF THE DRAWINGS

FIG. 4A is a schematic diagram showing the known distance image created under the operation shown in FIG. 2.

FIG. 4B is a schematic diagram showing the unknown distance image created under the operation shown in FIG. 3.

FIG. 5A is a schematic diagram showing the known distance image created under the operation shown in FIG. 2.

FIG. 5B is a schematic diagram showing the unknown distance image created under the operation shown in FIG. 3.

DETAILED DESCRIPTION

Figure 1:
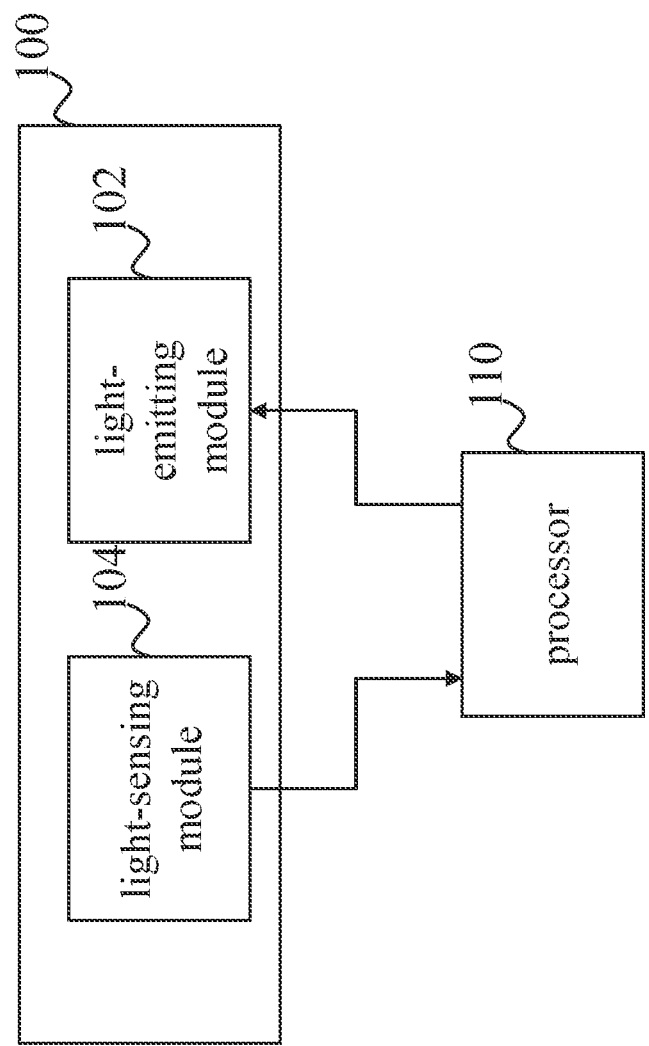
FIG. 1 is a schematic block diagram of a 3D image sensing system according to one embodiment of the present application.

The following disclosure provides many different embodiments, or examples, for implementing different features of the disclosure. Specific examples of components and arrangements are described below to simplify the present disclosure. As could be appreciated, these are, of course, merely examples and are not intended to be limiting. For example, the formation of a first feature over or on a second feature in the description that follows may include embodiments in which the first and the second features are formed in direct contact, and may also include embodiments in which additional features may be formed between the first and the second features, such that the first and the second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for the ease of the description to describe one element or feature's relationship with respect to another element(s) or feature(s) as illustrated in the drawings. The spatially relative terms are intended to encompass different orientations of the device in use or operation in addition to the orientation depicted in the figures. The apparatus may be otherwise oriented (e.g., rotated by 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. As could be appreciated, other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed considering the number of reported significant digits and by applying ordinary rounding techniques. Ranges can be expressed herein as from one endpoint to another endpoint or between two endpoints. All ranges disclosed herein are inclusive of the endpoints unless specified otherwise.

Current 3D image sensors can be implemented in three main approaches: stereo binocular, structured light, and time of flight (ToF). The ToF approach often uses a sensor to measure the time that the photon takes to fly and return to obtain the ToF distance, which is the distance between the sensor and the target under measurement.

However, the TOF distance obtained by the sensor is often influenced by the physical characteristics of the sensor's electronic components. For example, when the temperature of the operating environment of the sensor changes, it may change the physical characteristics of the sensor's electronic components so that the ToF distance has a temperature-dependent global offset. The so-called global offset means that under the same operating conditions, targets at different depths have the same offset with respect to their true depths. Therefore, the accuracy of the sensor can be improved by deducting the global offset from the ToF distance.

Using structured light to measure distances is based on the principle of triangulation, which is not affected by temperature. Therefore, the 3D image sensing system of the present application eliminates the global offset of the ToF distance by means of the implementation of structured light, so that the ToF after the elimination of the global offset can reflect the true depth more accurately, thereby improving the accuracy of the image sensing, the details of which are described below.

FIG. 1 is a schematic block diagram of a 3D image sensing system 10 according to one embodiment of the present application. Referring to FIG. 1, the 3D image sensing system 10 has a reference establishment operation and a sensing operation, the details of which are described in embodiments shown in FIG. 2 and FIG. 3.

First, the 3D image sensing system 10 establishes reference information in the reference establishment operation. It should be noted that, the reference establishment operation can be carried out before the 3D image sensing system 10 leaves the manufacturing factory or it can be performed by a user after the 3D image sensing system 10 is delivered to the user. Next, the 3D image sensing system 10 performs a TOF distance measurement method under the sensing operation to generate depth information of a target, and use the reference information to correct the depth information, so that the corrected depth information can reflect the true depth accurately, the details of which are described below The 3D image sensing system 10 includes a 3D image sensor 100 and a processor 110. The 3D image sensor 100 includes a light-emitting module 102 and a light-sensing module 104. The light-emitting module 102 emits structured light that has a known pattern. In some embodiments, the structured light includes point-structured light, line-structured light, or plane-structured light. In some embodiments, when the structured light is the plane-structured light, the plane-structured light can be speckle light. The light-sensing module 104 is configured to receive the structured light that is reflected, which is referred to as "reflected structured light."

The processor 110 is coupled to the 3D image sensor 100, which establishes reference information based on reflected structured light generated during the reference establishment operation, and then creates depth information based on the reflected structured light generated during the sensing operation and uses the reference information to correct the depth information. In some embodiments, the processor 110 includes a microcontroller unit (MCU), a central processing unit (CPU) or a graphics processing unit (GPU). The 3D image sensing system 10 further includes a memory device (not shown). In some embodiments, a computer program is stored on the memory and operable on the processor 110. When the processor 110 is running the computer program, the processor 110 is configured to perform the method of the present disclosure. The memory device may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on the memory, which may be incorporated into a computer program product.

Figure 2:
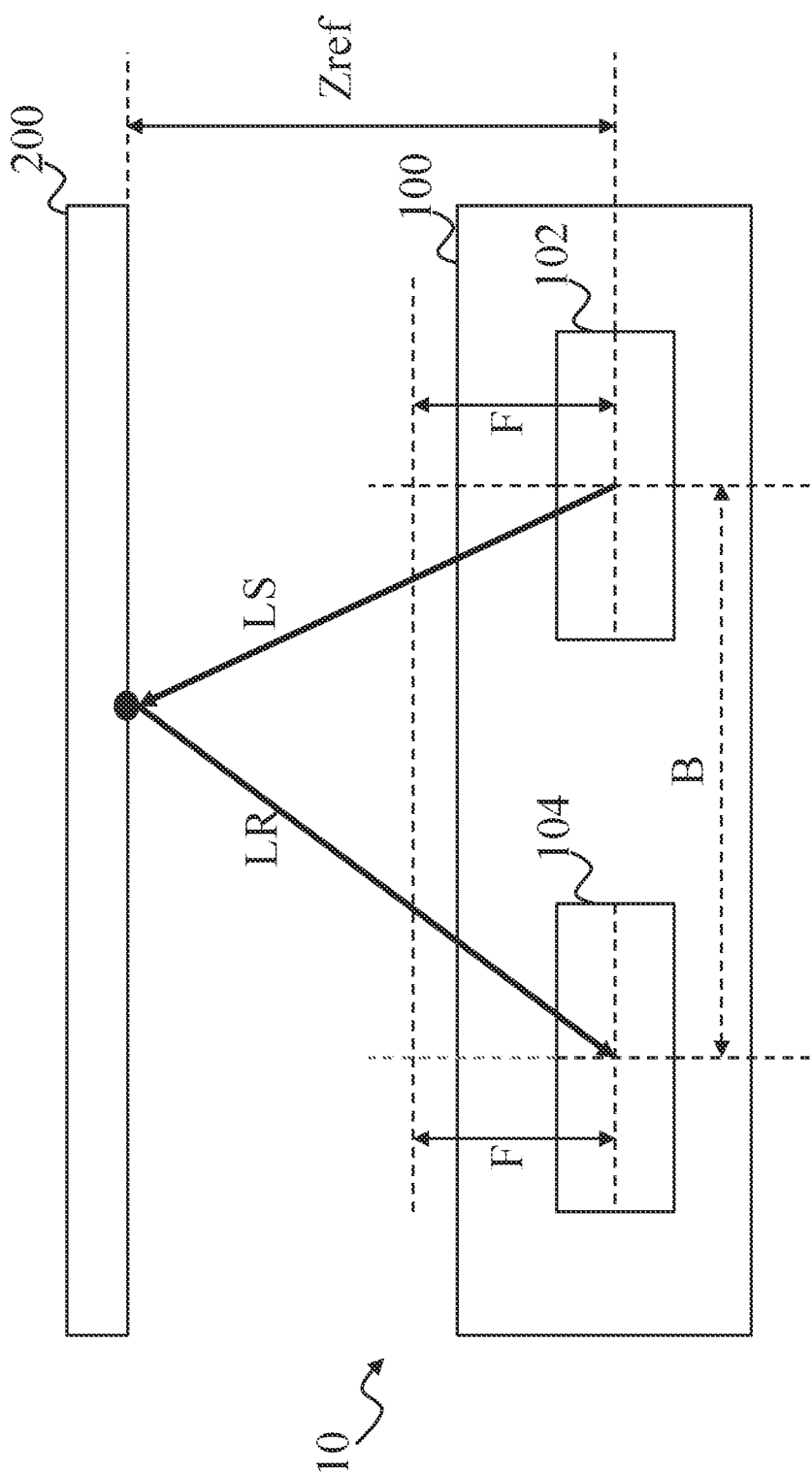
FIG. 2 is a schematic diagram showing the 3D image sensing system of FIG. 1 operating under an exemplary reference establishment operation.

FIG. 2 is a schematic diagram showing the 3D image sensing system 10 of FIG. 1 operating under an exemplary reference establishment operation; for the sake of brevity, the processor 110 is not shown in the drawing. Also, in FIG. 2, The value of the baseline distance B between the light-emitting module 102 and the light sensing module 104 is known, and the value of the focal length F of the light-emitting module 102 is also known. The values of the baseline distance B and the focal length F may be pre-stored in the 3D image sensor 100 or the memory device of the 3D image sensing system 10. FIG. 4A is a schematic diagram showing the known distance image 400 established under the operation shown in FIG. 2.

Referring to FIG. 2, during the reference establishment operation, the reference object 200 is disposed at a location with a known distance Zref with respect to the 3D image sensor 100. It should be noted that, the sizes of the objects shown in FIG. 2 are graphically exaggerated. Therefore, the known distance Zref can be considered as the distance between the reference object 200 and the light-emitting module 102, as well as the distance between the reference object 200 and the light-sensing module 104. Additionally, in ideal scenarios, the surface of the reference object 200 facing the 3D image sensor 100 is substantially flat. In other words, the distances between the respective part of the reference object 200 and the 3D image sensor 100 are equal, that is to say, the depths are the same, i.e., all distances are the known distance Zref. However, the present application is not limited to such implementation. In some embodiments, different portions on the surface of the reference object 200 may have different depths. Moreover, in ideal scenarios, the structured light LS emitted from the light-emitting module 102 can reach each and every portion on the surface of the reference object 200.

During operation, the light-emitting module 102 emits structured light LS to the reference object 200, wherein the structured light LS has a known pattern. In the present embodiment, the structured light LS is point-structured light. The light-sensing module 104 receives the reflected structured light LR of the structured light LS that is reflected by the reference object 200. In this way, the reflected structured light LR also has a known pattern; that is, the structured light LR that is reflected by the reference object 200 and the emitted structured light LS have substantially the same structured light pattern. The processor 110 establishes a known distance image 400 based on the reflected structured light LR, see, FIG. 4A. Referring to FIG. 4A, the known pattern in the known distance image 400 is shown as the pattern P.

Figure 3:
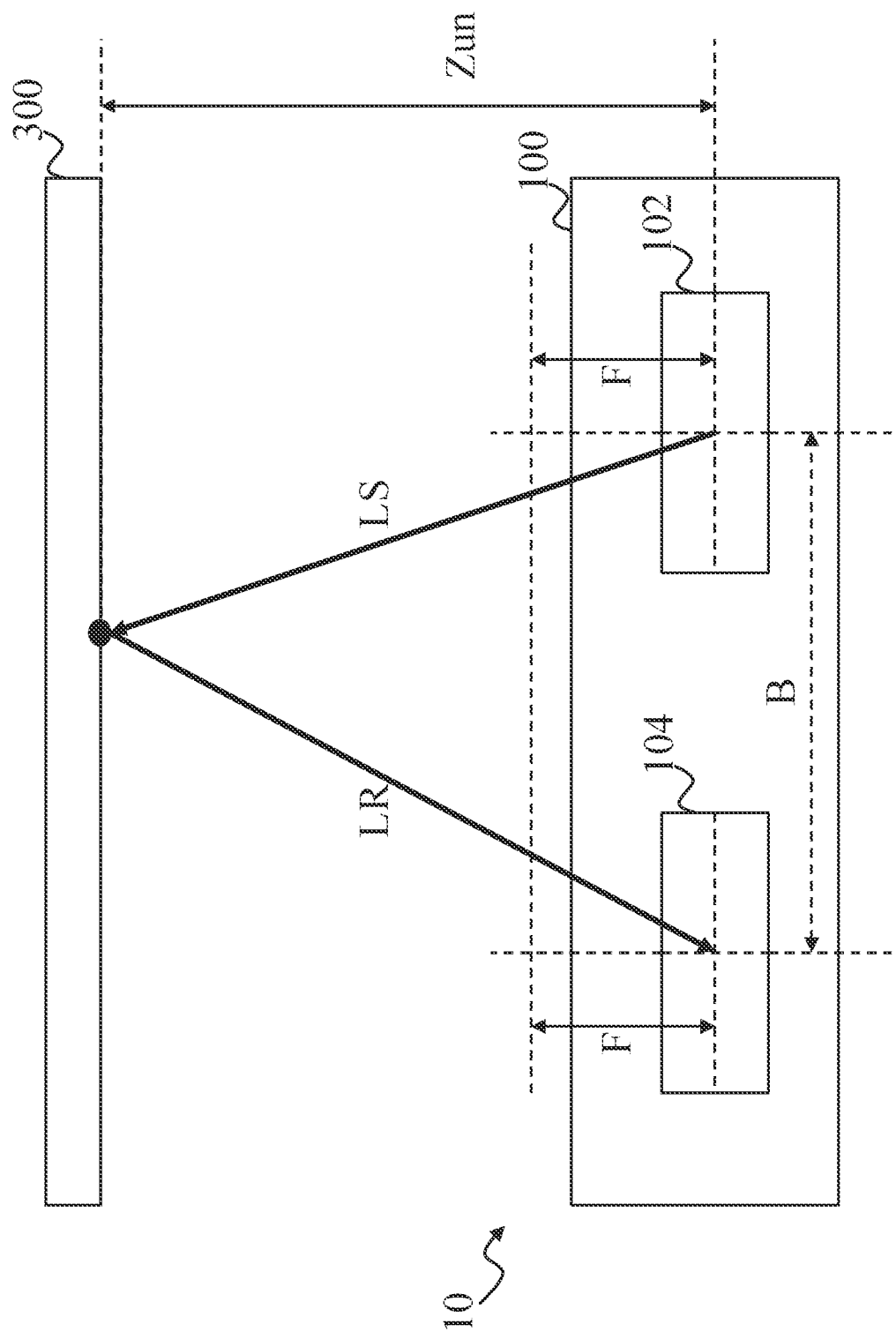
FIG. 3 is a schematic diagram showing the 3D image sensing system of FIG. 1 operating under an exemplary sensing operation.

FIG. 3 is a schematic diagram showing the 3D image sensing system 10 of FIG. 1 operating under an exemplary sensing operation. FIG. 4B is a schematic diagram showing the unknown distance image 450 established under the operation shown in FIG. 3. Referring to FIG. 3, the target 300 is disposed at a location with an unknown distance Zun with respect to the 3D image sensor 100. For simplicity, the surface of the target 300 facing the 3D image sensor 100 is substantially flat. In other words, the distances between the respective part of the target 300 and the 3D image sensor 100 are equal, that is to say, the depths are the same, i.e., all distances are the known distance Zun. However, the present application is not limited to such implementation. In some embodiments, different portions on the surface of the target 300 may have different depths. Moreover, in ideal scenarios, the structured light LS emitted from the light-emitting module 102 can reach each and every portion on the surface of the target 300.

During operation, the light-emitting module 102 emits structured light LS to the target 300. The light-sensing module 104 receives the reflected structured light LR of the structured light LS that is reflected by the target 300. The processor 110 measures the depth of the structured light and the depth of the ToF based on the emitted structured light LS and the reflected structured light LR.

For the ToF implementation, the processor 110 carries out the TOF distance measurement based on the ToFs of the structured light LS and the reflected structured light LR to obtain a corresponding first between the distance target 300 and the 3D image sensing system 10. In this way, the first distance can be obtained.

As discussed above, the first distance has a global offset. After performing the global offset compensation on the first distance, a detected distance without the global offset is obtained, or a compensated detected distance. The present application does so by finding an estimated value of the global offset (i.e., the global compensation coefficient) to compensate the global offset, which can be expressed as Equation (1) below:

$$Z = Z_{TOF} + C$$   Equation (1);

where Z represents compensated detected distance; $Z_{TOF}$ represents the first distance; and C represents the global compensation coefficient.

It should be noted that, in reality, since the 3D image sensing system 10 may still have errors other than the global offset, the compensated detected distance Z may still not be able to exactly equal the unknown distance Zun. Nonetheless, the elimination of the global offset alone already significantly improves the accuracy of the 3D image sensing system 10 in performing the TOF distance measurement.

The calculation of the global compensation coefficient C is discussed below. Since measuring distances based on the triangulation principle is not affected by temperature, the thus-obtained distance does not have the global offset. In other words, the distance obtained through triangulation can be considered as the compensated detected distance Z. Therefore, by comparing the distance obtained through triangulation with the first distance $Z_{TOF}$, it is feasible to estimate the global compensation coefficient C, the details of which are described below.

Triangulation can be implemented using the structured light; during operation, the processor 100 establishes an unknown distance image 450 based on the reflected structured light LR, as shown in FIG. 4B. Referring to FIG. 4B, the known pattern in the unknown distance image 450 is shown as the pattern P'. The processor 100 estimates the disparity between the known distance image 400 and the unknown distance image 450 according to the known pattern. Specifically, the processor 100 estimates the disparity according to the relative relationship between the pattern P' of the unknown distance image 450 and the pattern P of the known distance image 400.

After estimating the disparity, the processor 100 can calculate a second distance based on the estimated disparity and the values of the known baseline distance B and the focal length F, followed by triangulation. Put it in a simple way, the second distance is the distance obtained by performing triangulation on the structured light. The triangulation can be expressed as Equation (2) below:

$$Z_D = \frac{B \times F}{D}, \quad \text{Equation (2)}$$

wherein, $Z_D$ represents the second distance; an D represents the disparity.

Since the estimation of the second distance $Z_D$ is based on triangulation and thus do not have a global offset, in an ideal scenario, the second distance $Z_D$ equals to the compensated detected distance Z in Equation (1). Therefore, the global compensation coefficient C can be obtained by substituting the term (Z) in Equation (1) with the second distance $Z_D$ calculated from Equation (2).

Briefly, the processor 100 calculate the second distance $Z_D$ based on disparity D, and then calculates the global compensation coefficient C based on the first distance $Z_{TOF}$ and the second distance $Z_D$. Lastly, the processor 100 compensates the first distance $Z_{TOF}$ based on the thus-calculated global compensation coefficient C to eliminate the global offset. In other words, the compensated detected distance Z can be obtained by adding the calculated global compensation coefficient C to the first distance $Z_{TOF}$ as measured.

In some embodiments of estimating the disparity D, the processor 100 estimates the disparity D performing vector geocoding upon the known distance image 400 and the unknown distance image 450. For example, reference is made to both FIG. 4A and FIG. 4B. To better illustrate the principles of the present application, in the embodiments shown in FIG. 4A and FIG. 4B, the known distance image 400 and the unknown distance image 450 are vector geocoded according to a single axis, e.g., coordinate axis (X+, X−). However, the present application is not limited to such implementation. In other embodiments, the known distance image 400 and the unknown distance image 450 can be vector geocoded according to multiple axes.

After vector geocoding, the coordinate point Xp in the pattern P of the known distance image 400 is known; for example, the coordinate point Xp can be 30, and is labeled as Xp(30) in FIG. 4A. The coordinate point Xp' in the pattern P' of the unknown distance image 450 is known; for example, the coordinate point Xp' is 60, and is labeled as Xp'(60) in FIG. 4B. The difference in the values of the coordinate points Xp and Xp' is the disparity D. in the present example, the disparity D is 30. After completing the estimation of the disparity D, the global compensation coefficient C can be obtained using Equation (1) and (2).

FIG. 5A is a schematic diagram showing the known distance image 500 established under the operation shown in FIG. 2. FIG. 5B is a schematic diagram showing the unknown distance image 550 established under the operation shown in FIG. 3. Referring to both FIG. 5A and FIG. 5B; in the embodiments shown in FIG. 5A and FIG. 5B, the structured light is the plane-structured light, and the plane-structured light is speckle light. In other words, the structured light includes a plurality of known patterns. The methods for establishing the known distance image 500 and unknown distance image 550 are similar to those for establishing the known distance image 400 and the unknown distance image 450 shown in FIG. 4A and FIG. 4B, and hence are omitted herein for the sake of brevity.

The known distance image 500 includes a plurality of patterns, such as patterns P1 and P2. The unknown distance image 550 includes a plurality of patterns, such as patterns P1' and P2', which respectively correspond to the plurality of patterns in the known distance image 500. In the embodiment where the structured light is the plane-structured light, the following embodiments can be used to calculate the global compensation coefficient C.

Embodiment I

In the present embodiment, pattern P1 of the known distance image 500 is used as an example, and the operation on the other patterns is the same. First, it needs to identify which the pattern in the unknown distance image 550 does the pattern P1 in the known distance image 500 correspond to. After the identification, one can tell that the pattern P1 in the known distance image 500 corresponds to the pattern P1' in the unknown distance image 550. Next, performing vector geocoding upon the known distance image 500 and unknown distance image 550 according to the method set forth with respect to FIGS. 4A and 4B, thereby obtaining the coordinate of each pattern, including obtaining the coordinates of the pattern P1 and the pattern P1'. The value of the difference between the coordinate points of the patterns P1 and P1' is the disparity D corresponding to patterns P1 and P1'. Using the same method, it is feasible to obtain the disparity D corresponding to each pair of patterns. Then, the global compensation coefficient C is calculated based on Equation (1) and Equation (2).

However, it should be noted that, in the present embodiment, the number of the paired patterns is more than one. Each pair of patterns has its own first distance $Z_{TOF}$ and disparity D, and when the number of the paired patterns is greater than one, it is difficult to find a matching global compensation coefficient C using mathematic calculation, so that the global compensation coefficient C can be used to obtain a second distance $Z_D$ that is equal to the compensated detected distance Z for each pair of patterns. Therefore, in the present embodiment, the following Equation (3) is used to calculate the global compensation coefficient C. The thus-obtained global compensation coefficient C can be used to obtain a second distance $Z_D$ that is equal to the compensated detected distance Z for each pair of patterns.

$$\operatorname{argmin}\left[\sum Z_D \square \sum Z\right]^2 \quad \text{Equation (3)}$$

$$\square \operatorname{argmin}\left[\sum \frac{B \times f}{D} \square \sum (Z_{TOF} \square C)\right]^2.$$

For example, assuming that the known distance image 500 only includes patterns P1 and P2 (i.e., the total number of the patterns is 2), and the unknown distance image 550 only includes patterns P' and P2' (i.e., the total number of the patterns is 2). The pattern P1 is related to the distance $Z_{TOF1}$, and the disparity between the pattern P1 and pattern P1' is D1. Similarly, the pattern P2 is related to the distance $Z_{TOF2}$, and the disparity between the pattern P2 and the pattern P2' is D2. Substituting these factors into Equation (3), the following equation is obtained, which can be used to calculate the global compensation coefficient C.

$$\operatorname{argmin}\left[\left[\frac{B \times f}{D1} + \frac{B \times f}{D2}\right] - \left[(Z_{TOF1} + C) + (Z_{TOF2} + C)\right]\right]^2$$

Embodiment II

In Embodiment II, the operation performed is based on a further approximation of Equation (3) of Embodiment I. In detail, Equation (3) can be further approximated to the following Equation (4).

$$\operatorname{argmin}\left[\sum Z_D \square \sum Z\right]^2$$
$$\square \operatorname{argmin}\left[\sum \frac{b \times f}{D} \square \sum (Z_{TOF} \square C)\right]^2 \quad \text{Equation (3)}$$
$$\approx \operatorname{argmin}\left[\sum \frac{D}{b \times r} - \sum \left(\frac{1}{(Z_{TOF} \square C)}\right)\right]^2. \quad \text{Equation (4)}$$

In Equation (4), since the disparity D is part of the numerator, when all the disparity values D are added, it is easy to calculate. When this equivalent is reflected in the operation, it means that as long as the coordinates of all patterns of the known distance image 500 are summed and then the sum of the coordinates of all patterns of the unknown distance image 550 is subtracted, the global compensation coefficient C can be calculated. It is no longer necessary to perform an identification operation to find the paired patterns between the known distance image 500 and the unknown distance image 550.

To facilitate the understanding, only the patterns P1 and P2 in the known distance image 500 and the patterns P1' and P2' in the unknown distance image 550 are discussed below. The coordinates of the patterns P1 and P2 are X1 and X2, respectively; and the coordinates of the patterns P1' and P2' are X1' and X2', respectively.

For the term ($\Sigma D$) in the term $$\left(\sum \frac{D}{b \times f}\right)$$

of Equation (4), assuming the pattern P1 corresponding pattern P1' and pattern P2 corresponding pattern P2', then the term ($\Sigma D$) can be expressed as the term [(X1−X1')+(X2−X2')]. If we use the operation shown in Embodiment II, then the term (ED) can be expressed as the term [(X1+X2)−(X1'+X2')]. Comparing the term [(X1−X1')+(X2−X2')] and [(X1+X2)−(X1'+X2')], one may find that the results of the term [(X1−X1')+(X2−X2')] and the term [(X+X2)−(X1'+X2')] are the same. In other words, adopting the operation shown in Embodiment II does not affect the calculation results, yet, it can significantly improve the computation efficiency by omitting the identification operation. In short, the processor 100 generates a first overall coordinates (i.e., (X1'+X2')) based on the overall pattern of the unknown distance image 550 and generates a second overall coordinates (i.e., (X1+X2)) based on the overall pattern of the known distance image 500, and then determines the disparity D according to the difference between the first overall coordinates and the second overall coordinates.

The present application calculates the global compensation coefficient for TOF measurement through the actual measuring data by using the structured light, which can compensate the global offset of the TOF measurement caused by the environmental temperature change, and make the measurement more accurate.

Figure 6:
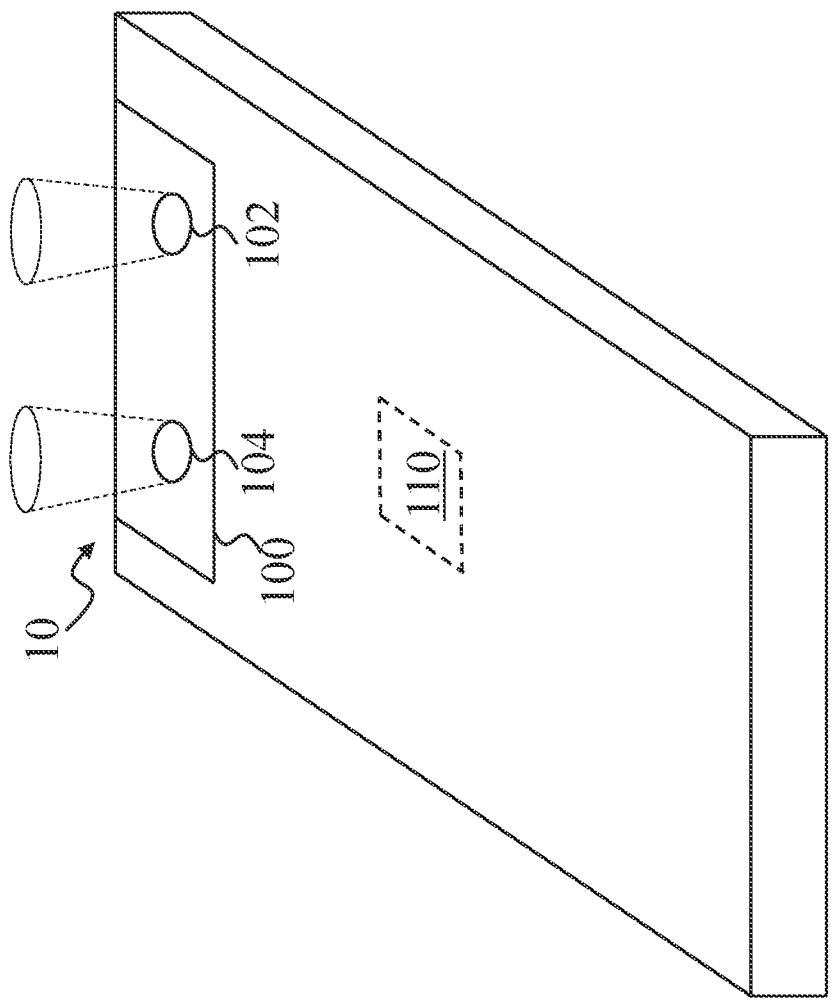
FIG. 6 is a schematic block diagram of the 3D image sensing system of FIG. 1 being applied in an electronic device according to one embodiment of the present application.

FIG. 6 is a schematic block diagram of the 3D image sensing system 10 of FIG. 1 being applied in an electronic device 60 according to one embodiment of the present application. Referring to FIG. 6, the electronic device 60 can be for example, a smart phone, personal digital assistant, hand-held computer system, tablet computer, or the like.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A three-dimensional (3D) image sensing system, comprising:
    a 3D image sensor, comprising:
        a light-emitting module, configured to emit a structured light to a target, wherein the structured light has a known pattern; and
        a light-sensing module, configured to receive a reflected structured light of the structured light that is reflected by the target; and
    a processor, coupled to the 3D image sensor and configured to perform a time-of-flight distance measurement to obtain a first distance corresponding to the target based on time-of-flights of the structured light and the reflected structured light, wherein the first distance has a global offset,
    wherein the processor is further configured to establish an unknown distance image based on the reflected structured light, estimates a disparity between the unknown distance image and a known distance image according to the known pattern, calculates a global compensation coefficient based on the disparity, and compensates the first distance to eliminate the global offset according to the global compensation coefficient,
    wherein the known distance image is established with respect to a reference object with a known distance based on the structured light.

2. The 3D image sensing system of claim 1, wherein the processor calculates the global compensation coefficient based on the disparity and the first distance.

3. The 3D image sensing system of claim 1, wherein the processor further calculates a second distance based on the disparity.

4. The 3D image sensing system of claim 3, wherein the processor calculates the global compensation coefficient according to the disparity, the first distance and the second distance.

5. The 3D image sensing system of claim 1, wherein the processor determines the disparity by performing vector geocoding upon the unknown distance image and the known distance image.

6. The 3D image sensing system of claim 5, wherein the processor generates a first overall coordinate based on the overall pattern of the unknown distance image, and generates a second overall coordinate based on the overall pattern of the known distance image, and determines the disparity according to a difference between the first overall coordinate and the second overall coordinate.

7. The 3D image sensing system of claim 1, wherein the structured light comprises point-structured light, line-structured light, or plane-structured light.

8. The 3D image sensing system of claim 7, wherein when the structured light includes the plane-structured light, the plane-structured light includes speckle light.

9. A time-of-flight distance measurement method, comprising:
- emitting a structured light to a target, wherein the structured light has a known pattern;
- receiving a reflected structured light reflected by the target;
- performing a time-of-flight distance measurement to obtain a first distance corresponding to the target based on time-of-flights of the structured light and the reflected structured light, wherein the first distance has a global offset;
- establishing an unknown distance image based on the reflected structured light;
- estimating a disparity between the unknown distance image and a known distance image according to the known pattern, wherein the known distance image is created based on the structured light with respect to a reference object with a known distance;
- calculating a global compensation coefficient based on the disparity; and
- compensating the first distance according to the global compensation coefficient to eliminate the global offset.

10. The method of claim 9, wherein the calculating the global compensation coefficient based on the disparity comprises:
- calculating the global compensation coefficient based on the disparity and the first distance.

11. The method of claim 9, further comprising:
calculating a second distance based on the disparity.

12. The method of claim 11, further comprising:
determining the global compensation coefficient based on the first distance and the second distance.

13. The method of claim 9, further comprising:
determining the disparity by performing vector geocoding upon the unknown distance image and the known distance image.

14. The method of claim 13, wherein the determining the disparity by performing vector geocoding upon the unknown distance image and the known distance image comprises:
- generating a first overall coordinate based on the overall pattern of the unknown distance image, generating a second overall coordinate based on the overall pattern of known distance image, and determining the disparity according to a difference between the first overall coordinate and the second overall coordinate.

15. An electronic device, comprising a memory, a processor, and a computer program stored on the memory and operable on the processor, wherein the processor, when running the computer program, is configured to:
- performing a time-of-flight distance measurement to obtain a first distance corresponding to a target based on time-of-flights of a structured light having a known pattern projected to the target and a reflected structured light from the target, wherein the first distance has a global offset;
- generating an unknown distance image based on the reflected structured light;
- estimating a disparity between the unknown distance image and a known distance image according to the known pattern, wherein the known distance image is created based on the structured light with respect to a reference object with a known distance;
- calculating a global compensation coefficient based on the disparity; and
- compensating the first distance according to the global compensation coefficient to eliminate the global offset.

16. The electronic device according to claim 15, wherein the time-of-flight distance measurement and unknown distance image are obtained by a single image sensor.

* * * * *